United States Patent Office 2,990,427
Patented June 27, 1961

2,990,427
PROCESSES FOR THE OXIDATION OF ORGANIC COMPOUNDS
Alexander Muirhead Ure Caldwell, Norton-on-Tees, England, assignor to Imperial Chemical Industries Limited, London, England, a corporation of Great Britain
No Drawing. Filed Nov. 19, 1957, Ser. No. 697,320
Claims priority, application Great Britain Nov. 21, 1956
9 Claims. (Cl. 260—604)

This invention relates to processes for the partial oxidation of organic compounds, in particular olefinic hydrocarbons, and to catalysts for use in these processes.

According to the present invention there is provided a process for the partial oxidation of olefinic hydrocarbons which comprises contacting the olefine in the vapour phase in admixture with oxygen or a gas containing free oxygen and at elevated temperature, with a catalyst comprising a compound obtained by the melting together of molybdenum trioxide and an oxide of at least one metal selected from copper, iron, calcium, magnesium and lead.

A suitable range of temperature is from 300° C. to 600° C.

The process of the present invention is of particular value in the oxidation of butenes, for example isobutene, to products such as aldehydes, ketones and acids.

While substantially pure oxygen or oxygen in admixture with inert gases may be used in the process of the present invention it is convenient to use air. The proportion of air to olefinic hydrocarbon may be varied within wide limits, for example 95 to 85 parts of air by volume to 5 to 15 parts by volume of the hydrocarbon as vapour at the same temperature and pressure, and for other gaseous mixtures the proportions will be adjusted according to the oxygen content.

The catalysts may be prepared by grinding together molybdenum trioxide and an oxide of at least one of the above-mentioned metals and heating to fusion, cooling the product and grinding to a fineness such that the surface area is for example less than 3.0 square metres per gram as determined by the Brunauer-Emmett-Teller gas adsorption technique. The catalyst may be used in the powdered form or may be supported on one of the common inert supports, for example corundum, silica, silicon carbide or firebrick.

The proportions of the oxides used in preparing the catalyst may be varied over a wide range, for example the molybdenum trioxide may be from 5 to 80 moles percent of the total.

In general the catalysts of the present invention have large pore structures which aid the removal of partially oxygenated products from their active surfaces thus decreasing to a minimum the residence time of the product on the catalyst and thereby considerably decreasing any tendency to the formation of carbon oxides by exhaustive oxidation. It is nevertheless preferable for the catalysts to be used with short contact times, for example of from 0.1 second to 2 seconds calculated on the bulk catalyst volume and the whole reaction mixture.

Catalysts prepared in accordance with the present invention from copper oxide (CuO) over a wide range of compositions, for example from 20 moles to 95 moles percent of CuO, have been found particularly effective over long periods for the production of formaldehyde from isobutene with but trace amounts of other products, for example acetic acid, acetone, methacrolein and glyoxal.

The invention is illustrated by the following examples.

Example 1

A catalyst was prepared by grinding and fusing together copper oxide (CuO) and molybdenum trioxide ($MoO_3$) in the molar proportions of 20 CuO to 80 $MoO_3$. The melt was agitated for a time to ensure thorough mixing and then allowed to cool. During the cooling some oxygen was evolved. The cooled mass was ground and sieved to pass British Standard Sieve No. 100 (150μ).

5 grams of the finely divided catalyst were compounded on to 30 ml. of 1/8" to 3/16" particles of corundum.

The supported catalyst was placed in a reactor of silica which was heated externally in a salt bath of a mixture of sodium nitrite and sodium nitrate maintained at 450° C.

A gaseous mixture consisting of 85 parts by volume of air and 15 parts by volume of isobutene was passed through the reactor at a rate of 100 litres per hour. The isobutene was converted to formaldehyde with a pass yield of 16 percent and an efficiency of 36% where efficiency is defined as the ratio of moles of formaldehyde produced to moles of isobutene reacted.

Example 2

A catalyst was prepared in a manner similar to that described in Example 1 except that the molar proportions were 95 CuO to 5 $MoO_3$.

The catalyst was used under the same conditions as for Example 1 and the isobutane was converted to formaldehyde with a pass yield of 10 percent and an efficiency of 56 percent.

Example 3

A catalyst was prepared by grinding and fusing together copper oxide (CuO) and molybdenum trioxide ($MoO_3$) in the molar proportions of 93 CuO to 7 $MoO_3$. The melt was agitated for a time to ensure thorough mixing and then allowed to cool. The cooled mass was ground and sieved to pass British Standard Sieve No. 100 (150μ).

5 grams of the finely divided catalyst were compounded on to 30 ml. of 1/8" to 3/16" particles of corundum.

The supported catalyst was placed in a reactor of silica which was heated externally in a salt bath of a mixture of sodium nitrite and sodium nitrate maintained at 503° C.

A gaseous mixture consisting of 150 parts by volume of air and 17 parts by volume of isobutene was passed through the reactor at a rate of 167 litres per hour. The isobutene was converted to formaldehyde with a pass yield of 9 percent and an efficiency of 83 percent.

Example 4

A catalyst was prepared in a manner similar to that described in Example 3 except that the catalyst support was firebrick and 5 grams of the finely divided catalyst were compounded on to 30 ml. of 1/8" to 3/16" particles of this material.

A gaseous mixture consisting of 85 parts by volume of air and 15 parts by volume of isobutene was passed at a rate of 100 litres per hour through the reactor, which was heated to a temperature of 544° C. The isobutene was converted to formaldehyde with a pass yield of 15 percent and an efficiency of 54 percent.

Example 5

A catalyst was prepared in a manner similar to that described in Example 3 except that the catalyst support was silicon carbide and 5 grams of the finely divided catalyst was compounded on to 30 ml. of 1/8" to 3/16" particles of this material.

The catalyst was used under the same conditions as for Example 4 and the isobutene was converted to formaldehyde with a pass yield of 14 percent and an efficiency of 40 percent.

I claim:

1. A process for the partial oxidation of monoolefinic hydrocarbons, having 4 carbon atoms, to produce formaldehyde, which comprises contacting said olefine in the vapor phase in admixture with a gas containing free oxygen and at a temperature in the range of 300° C. to 600°

C. with a catalyst consisting essentially of a compound obtained by melting together molybdenum trioxide and copper oxide (CuO) in which the proportions of oxides used in preparing the catalyst are such that molybdenum trioxide is from 5 to 80 moles percent of the total.

2. A process as claimed in claim 1, wherein said gas is substantially pure oxygen.

3. A process as claimed in claim 1 in which air is used as the gas containing free oxygen.

4. A process as claimed in claim 3 in which the proportion of air to said monoolefinic hydrocarbon is 95 to 85 parts by volume of air: 5 to 15 parts by volume of the hydrocarbon as vapour at the same temperature and pressure.

5. A process as claimed in claim 1 in which copper oxide (CuO) in an amount of from 20 moles to 95 moles percent is used in the preparation of the catalyst.

6. A process for the production of formaldehyde which comprises contacting isobutene in the vapor phase in admixture with a gas containing free oxygen and at a temperature in the range of 300° to 600° C. with a catalyst comprising a compound obtained by melting together molybdenum trioxide and copper oxide (CuO) in which the proportions of oxides used in preparing the catalyst are such that molybdenum trioxide is from 5 to 80 moles percent of the total.

7. A process as claimed in claim 6, in which air is used as the gas containing free oxygen.

8. A process as claimed in claim 6, in which the proportion of air to isobutene is 95 to 85 parts by volume of air: 5 to 15 parts of isobutene as vapor at the same temperature and pressures.

9. A process as claimed in claim 6, in which copper oxide (CuO) in an amount of from 20 moles to 95 moles percent is used in the preparation of the catalyst.

References Cited in the file of this patent

UNITED STATES PATENTS

| | | |
|---|---|---|
| 1,844,857 | Larson | Feb. 9, 1932 |
| 2,066,622 | Hasche | Jan. 5, 1937 |
| 2,181,143 | Marks | Nov. 28, 1939 |
| 2,215,095 | Drossbach | Sept. 17, 1940 |
| 2,486,842 | Hearne et al. | Nov. 1, 1949 |
| 2,504,034 | Morrell | Apr. 11, 1950 |
| 2,627,527 | Connolly et al. | Feb. 3, 1953 |
| 2,773,838 | Reed et al. | Dec. 11, 1956 |

FOREIGN PATENTS

| | | |
|---|---|---|
| 381,570 | Great Britain | Oct. 3, 1932 |